United States Patent [19]
Justesen

[11] Patent Number: 6,057,770
[45] Date of Patent: May 2, 2000

[54] WATER LEAKAGE DETECTION AND FLOOD PREVENTION DEVICE

[76] Inventor: Edward Justesen, 29421 Via San Sebastion, Laguna Niguel, Calif. 92677

[21] Appl. No.: 09/037,486

[22] Filed: Mar. 10, 1998

[51] Int. Cl.[7] .................................................. G08B 21/00
[52] U.S. Cl. .......................... 340/605; 340/514; 340/652; 340/631; 340/643
[58] Field of Search ..................................... 340/605, 514, 340/652, 631, 643

[56] References Cited

U.S. PATENT DOCUMENTS

| | | | |
|---|---|---|---|
| 4,324,268 | 4/1982 | Jacobson | 340/605 |
| 4,775,855 | 10/1988 | Cox | 340/605 |
| 4,845,472 | 7/1989 | Gordon et al. | 340/605 |
| 5,188,143 | 2/1993 | Krebs | 340/605 |
| 5,190,069 | 3/1993 | Richards | 340/605 |
| 5,240,022 | 8/1993 | Franklin | 340/605 |
| 5,334,973 | 8/1994 | Furr | 340/605 |
| 5,428,347 | 6/1995 | Barron | 340/605 |
| 5,650,564 | 7/1997 | Wodeslavsky et al. | 340/605 |

*Primary Examiner*—Jeffery A. Hofsass
*Assistant Examiner*—Tai T. Nguyen
*Attorney, Agent, or Firm*—Goldstein & Canino

[57] ABSTRACT

A device for detecting water leakage and preventing flooding from a water-utilizing appliance connected to water supply lines with water hoses, comprising a main electric unit which attaches to a power line. The main electric unit includes outlets, into which the power cords of the water-utilizing appliance are plugged, and a plurality of water sensor strips extending from the main electric unit for detecting the presence of water. The water leakage detection and flood prevention device further comprises solenoid-actuated cut-off valves connected between the water supply lines and the water hoses of the water-utilizing appliance. When a water leak is detected by the water sensor strips, a circuit breaker within the main electric unit shuts off, cutting power to the outlets and the solenoid-actuated cut-off valve, thereby disconnecting the water supply and electric power to the water-utilizing appliance in order to prevent a flood.

5 Claims, 3 Drawing Sheets

WATER LEAKAGE DETECTION AND FLOOD PREVENTION DEVICE

BACKGROUND OF THE INVENTION

This invention relates to a water leakage detection and flood prevention device. More particularly, the invention relates to a device which employs a main electric unit plugged into an ordinary household outlet, water sensor strips extending from the main electric unit, and solenoid-actuated cut-off valves attached between water supply lines and water hoses, designed for shutting off the water supply and the electric power to a water-utilizing appliance in the event the water sensor strips detect a leak or a flood.

Nowadays, a typical residential house or building is equipped with a wide variety of water-utilizing appliances, including a washing machine, a dishwasher, a water heater, and many others. Occasionally, a leak may develop in the appliance itself or somewhere along the water connections, which if not stopped in time, may lead to a serious flooding of the house, possibly damaging items that are sensitive to water, including flooring, appliances, equipment, furniture, and even the foundation. In the event of water leakage, the owner of the house or building may not only incur a considerable amount of property damages but also faces an expensive and troublesome cleaning operation. Thus, it is desirable to have a device that can detect the presence of water leakage as soon as it develops, and shut off water supply lines that are connected to the water-utilizing appliance to prevent further water leakage.

While various prior art references discloses devices that detect water leaks and automatically shuts off the water supply upon sensing water leakage, all incorporate relatively complicated configurations which are expensive to manufacture, difficult to incorporate into existing homes, and thus may not be suitable for average consumer use. For example, U.S. Pat. No. 4,297,686 to Tom discloses a water detection device that detects liquid drips, flows and trickles, and activates a solenoid operated water shut-off valve in response to detection of water. Likewise, U.S. Pat. No. 4,805,662 to Moody discloses a ground fault interrupter circuit which comprises a first output for providing electrical current to a solenoid valve that controls the supply of cold water to a conventional hot water heater and an other output for providing electrical current to a leak detector. U.S. Pat. No. 4,845,472 to Gordon discloses another apparatus for sensing the presence of unwanted water and operating a remote solenoid activated valve to shut off the water supply in response to the detecting of water. Similarly, U.S. Pat. No. 4,987,408 and 5,428,347 to Barron disclose a water sensor unit that monitors water related appliances and shuts off the power to the unit and simultaneously shuts off the water supply to that particular unit when leaking water is detected.

Despite all these devices for detecting water leaks, there is still a further need to provide an improved water leakage detection and flood prevention device. Such a water leakage detection and flood prevention device should be simple enough for an ordinary individual to set up without requiring professional installation, and yet is capable of shutting off the water supply and electrical power to a water-utilizing appliance in case of a water hose breakage or an overflow. Moreover, such a water leakage detection and flood prevention device should be capable of automatically shutting electric power to a water-utilizing appliance simply by cutting off the supply of current to the outlets of the main electric unit, into which the power cord of the appliance is connected.

While these units mentioned above may be suitable for the particular purpose employed, or for general use, they would not be as suitable for the purposes of the present invention as disclosed hereafter.

SUMMARY OF THE INVENTION

It is an object of the invention to provide a water leakage detection and flood prevention device which is easy to install, eliminating the need for professional installation.

It is another object of the invention to provide a water leakage detection and flood prevention device which is simple in construction so as to minimize manufacturing cost, and yet is capable of shutting off the water supply and electrical power to a water-utilizing appliance in case of a water hose breakage or an overflow.

It is yet another object of the invention to provide a water leakage detection and flood prevention device which can be readily incorporated into the existing hookup of a water-utilizing appliance.

It is a further object of the invention to provide a water leakage detection and flood prevention device which has a main electric unit into which the power cord of a appliance is connected. The device automatically shuts electrical power to the appliance by cutting off the supply of current to the outlets of the main electric unit when water leakage is detected.

It is a still further object of the invention to provide a water leakage detection and flood prevention device which employs a water sensing strips wrapped around water hoses for detecting the presence of leakage.

The invention is a device for detecting water leakage and preventing flooding from a water-utilizing appliance connected to water supply lines with water hoses, comprising a main electric unit which attaches to a power line. The main electric unit includes outlets, into which the power cords of the water-utilizing appliance are plugged, and a plurality of water sensor strips extending from the main electric unit for detecting the presence of water. The water leakage detection and flood prevention device further comprises solenoid-actuated cut-off valves connected between the water supply lines and the water hoses of the water-utilizing appliance. When a water leak is detected by the water sensor strips, a circuit breaker within the main electric unit shuts off, cutting power to the outlets and the solenoid-actuated cut-off valve, thereby disconnecting the water supply and electric power to the water-utilizing appliance in order to prevent a flood.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
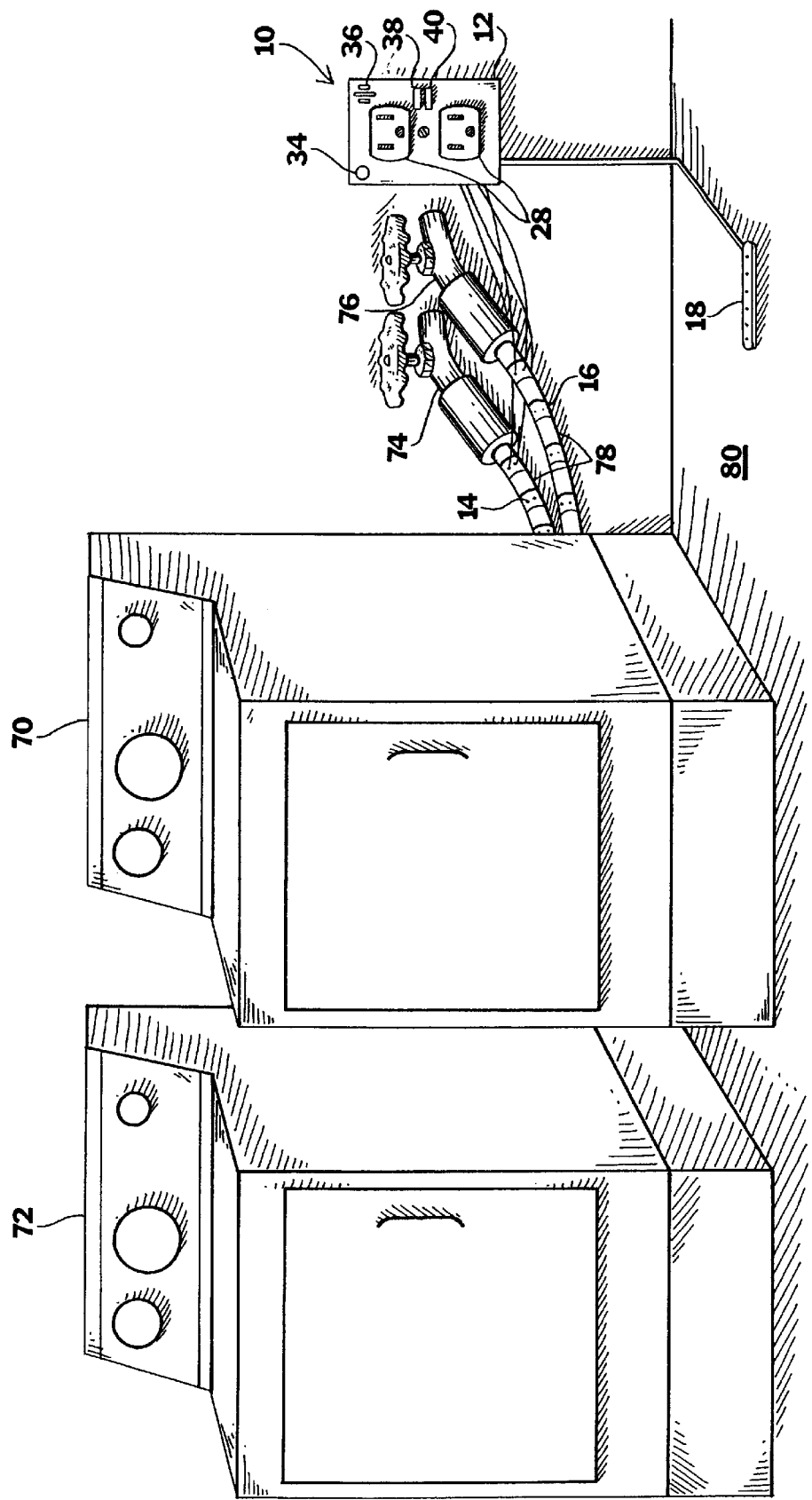
FIG. 1 is a diagrammatic perspective view, illustrating a typical laundry room incorporating the principles of a preferred embodiment of the present invention.

FIG. 1 illustrates a typical laundry room incorporating the principles of a preferred embodiment of the present invention 10. For a better understanding of the present invention 10, the typical laundry room is illustrated consisting generally of a washing machine 70, a cloth dryer 72, a hot-water supply line 74, a cold-water supply line 76, water hoses 78 which connect the washing machine 70 to the hot-water supply line 74 and cold-water supply line 76, and a floor 80. The water leakage detection and flood prevention device 10 comprises a main electric unit 12 which electrically connects directly to a 120 volt household power supply line and mounts into the wall taking place of an electrical outlet cover. Alternatively, the main electric unit 12 may be designed so that the main electric unit 12 can be plugged directly into an existing wall outlet to facilitate quick and easy installation of the present invention 10.

The water leakage detection and flood prevention device 10 further comprises a plurality of water sensor strips 14, 16, and 18 connected to the main electric unit 12 for detecting leaking water near the water-utilizing appliance 70. Three water sensor strips are used in the embodiment shown in FIGS. 1 and 2—a first water sensor strip 14 which is wrapped around the water hose 78 connected to the hot-water supply line 74, a second water sensor strip 16 which is wrapped around the water hose 78 connected to the cold-water supply line 76, and a third water sensor strip 18 that is placed on the floor 80 near the water-utilizing appliance 70, where it is most likely to detect water leaking from the appliance.

Figure 2:
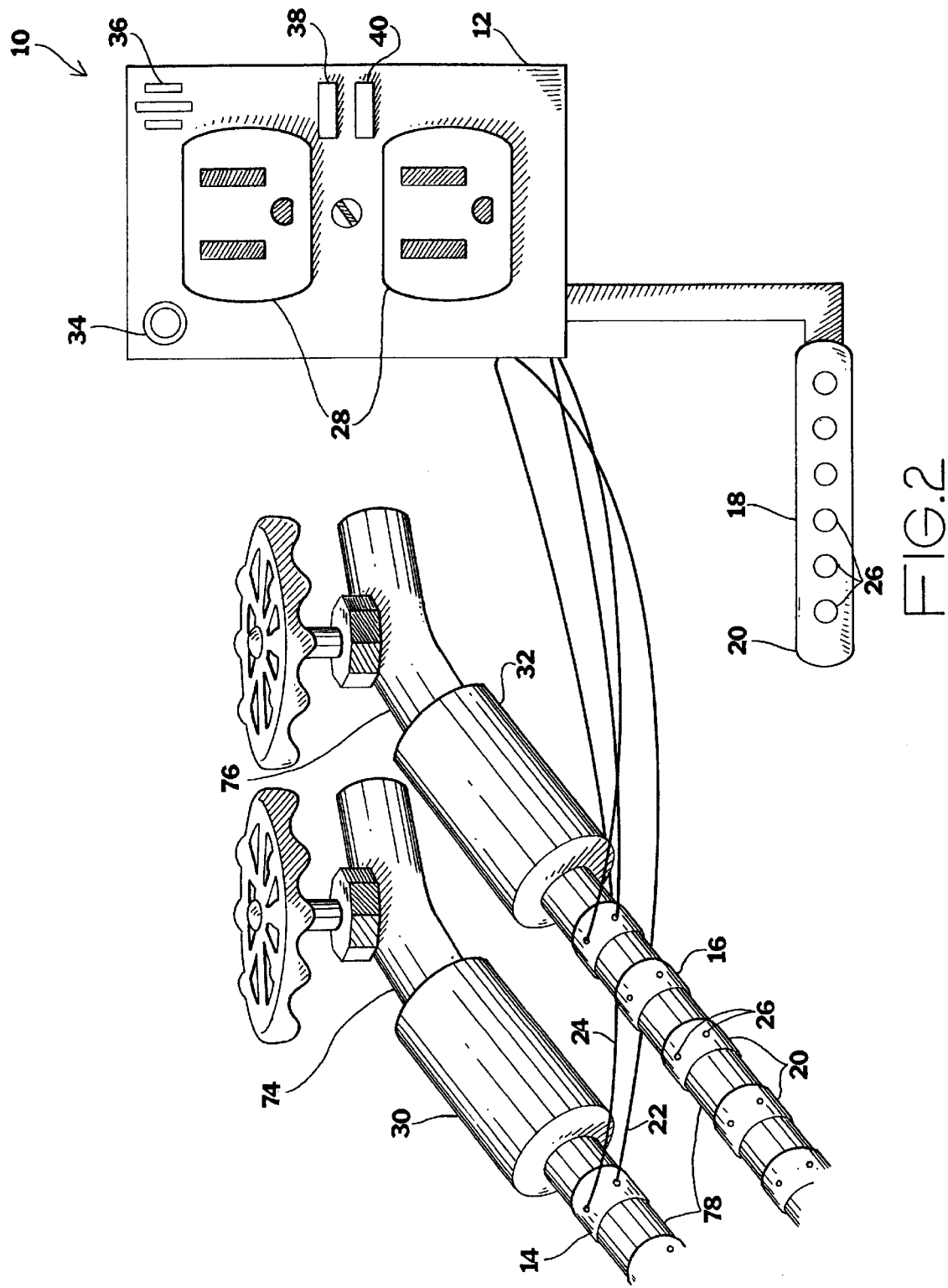
FIG. 2 is an enlarged view of the present invention, illustrating the solenoids connected between the water supply lines and the water hoses, and the water sensor strips extending from the main electric unit.

FIG. 2 illustrates functional components of the water leakage detection and flood prevention device 10. Each of the water sensor strips 14, 16, and 18 have an exterior covering 20 constructed of a flexible insulating material. A first electric conductor 22 and a second electric conductor 24 are disposed within the exterior covering 20 such that they are separated from each other so as to prevent electric current from flowing between the first 22 and second 24 conductors under normal dry conditions. The first 22 and second 24 conductors include a plurality of contact sensors formed thereon, which when exposed to water allow electric current to flow between the first 22 and second 24 conductors. The exterior covering 20 has a plurality of holes 26 for exposing the contact sensors of the electric conductors 22 and 24 to the surrounding environment, such that when water is present, indicative of a leak, the water enters the water sensor strip through the holes 26 therein making an electrical connection between the first 22 and second 24 conductors, thereby electrically closing the water sensor strip.

The main electric unit 12 includes two outlets 28, into which the power cord of the water-utilizing appliance 70 is plugged. A circuit breaker is provided within the main electric unit 12, which is electrically connected to the household power supply line, the water sensor strips 14, 16, and 18, and the outlets 28 such that in response to detection of water leakage, the circuit breaker shuts off, cutting power to the outlets 28, thereby disconnecting power to the water-utilizing appliance which is plugged into the outlets 28.

FIGS. 1 and 2 illustrate a first solenoid-actuated cut-off valve 30 connected between the hot-water supply line 74 and one of the water hoses 78, and a second solenoid-actuated cut-off valve 32 connected between the cold-water supply line 76 and the other water hose 78, for shutting off the water supply in the event a leakage of water is detected.

Each of the solenoid-actuated cut-off valves 30 and 32 is supplied with current by two low voltage wires extending from the main electric unit 12, which is not shown here. Under a normal dry condition, the solenoid-actuated cut-off valves 30 and 32 are in an open condition, allowing water to flow from the water supply lines 74 and 76, and into the water hoses 78 that are connected to the washing machine 70. However, when the presence of water is detected by the water sensor strips 14, 16, and 18, the circuit breaker within the main electric unit 12 shuts off, cutting power to the solenoid-actuated cut-off valves 30 and 32, closing the valves, restricting flow of water from the water supply lines 74 and 76 to the water hoses 78.

The main electric unit 12 is provided with an LED light 34, and an alarm 36 to let the occupants of the house know that a water leak may exist. The LED light 34 and the alarm 36 are electrically connected to the water sensor strips 14, 16, and 18, and the power supply line such that the LED light 34 flashes and the alarm 36 generates a warning sound in the event that the water sensor strips sense water. The main electric unit 12 is also provided with a test button 38 and a reset button 40 for manually triggering the circuit breaker, off and on. Pressing of the test button 38 simulates detection of a leak, whereby the electric power and the water supply to the appliance 70 is shut off. Alternatively, pressing of the reset button 40 turns the circuit breaker on, thereby allowing flow of electrical current and the water supply to the water-utilizing appliance 70.

Figure 3:
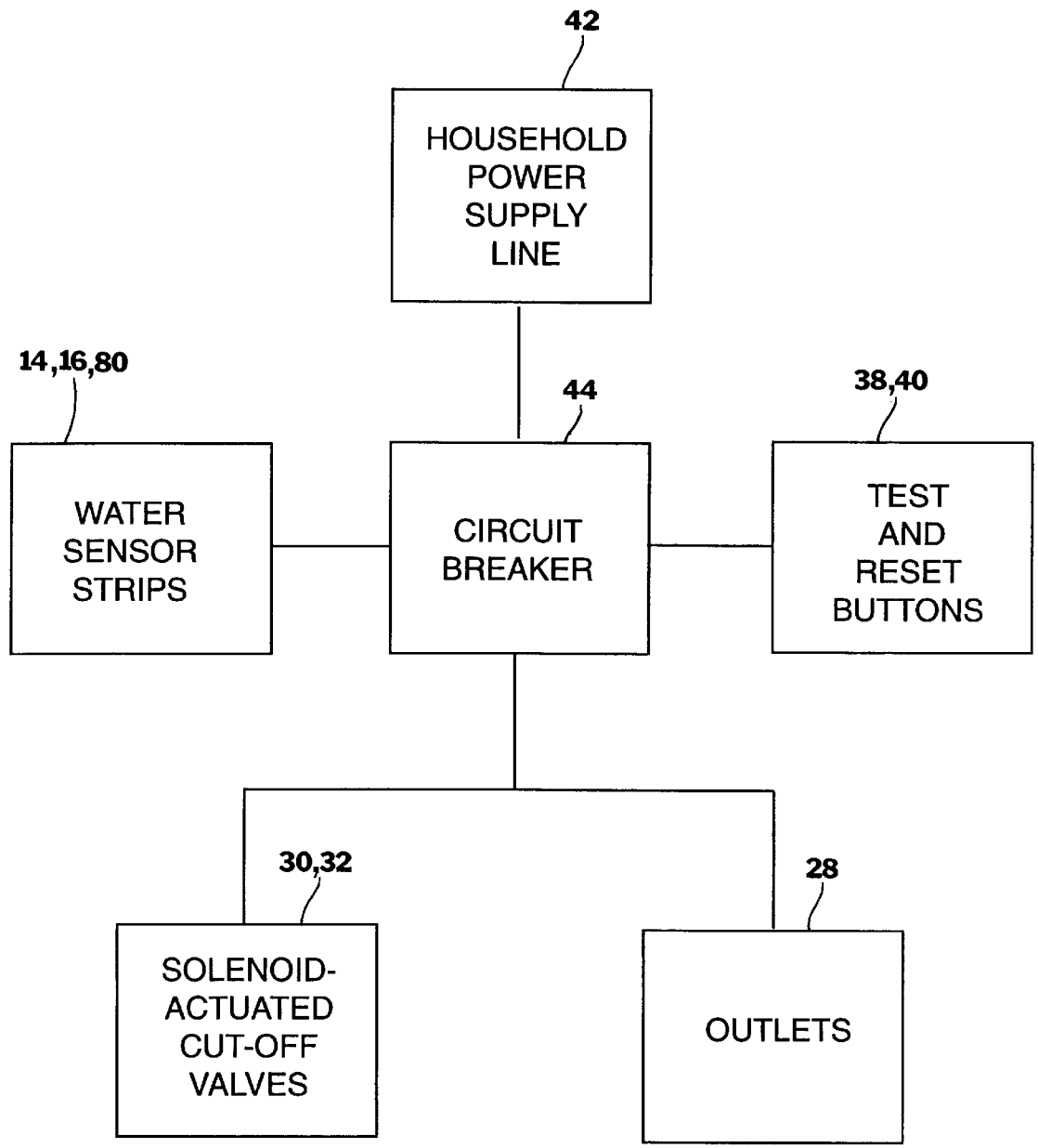
FIG. 3 is a block diagram of the present invention.

FIG. 3 schematically illustrates the primary components of the main electric unit 12 including the circuit breaker 44, the outlets 28 which are electrically connected to the 120 volt household power supply line 42, the water sensor strips 14, 16, and 18, and the solenoid-actuated cut-off valves 30 and 32, such that upon detection of water by the water sensor strips, the circuit breaker 44 shuts off, disconnecting power to the outlets 28 and the solenoid-actuated cut-off valves. This in turn causes the solenoid-actuated cut-off valves 30 and 32 to close, thereby restricting flow of water from the water supply lines 74 and 76. The electric power and the water supply to the water-utilizing appliance 70 is shut off and remains off until the circuit breaker 44 of the main electric unit 12 is reset by an individual, by manually pressing the reset button 40 provided thereon.

While the embodiments of the present invention 10 are disclosed in relation to preventing a flood near the washing machine 70, it will be appreciated by those skilled in the art that the water leakage detection and flood prevention device may also be used with any other water-utilizing appliances including a dishwasher, a water heater, or in any other location where a leak in a water pipe may cause a flood Many specific details contained in the above description merely illustrate some preferred embodiments and should not be construed as a limitation on the scope of the invention. Many other variations are possible.

What is claimed is:

1. A water leakage detection device for use with a water-utilizing appliance having a water hose, and a power cord, said device comprising:

a) a plurality of interchangable water sensing strips for detecting water, said water sensing strips placed near the water-utilizing appliance where water is likely to exist in the event of a water leakage including placing the strips on water pipes and a ground surface;

b) a solenoid-actuated cut-off valve connected to the water hose for shutting off water supply in the event a water leak is detected; and c) a main electric unit electrically connected to a power supply line, said main electric unit including at least one outlet, into which the power cord of the water-utilizing appliance is plugged, said main electric unit also including a circuit breaker which is electrically connected to the power supply line, the water sensor strips, the solenoid-actuated cut-off valve and the outlet such that when water leak is detected by the water sensing strips, the circuit breaker shuts off, disconnecting power to the outlet and the solenoid-actuated cut-off valve.

2. The device of claim 1, wherein the main electric unit further comprises a test button and a reset button for manually operating the circuit breaker for selectively turning the solenoid-actuated cut-off valves and the outlets, on and off.

3. The device of claim 2, wherein the main electric unit further comprises a LED light and an alarm, said LED light and said alarm electrically connected to the water sensor strips and the power supply line such that said LED light flashes and said alarm generates warning sound in the event of the water sensor strips sensing presence of water in order to alert household occupants that a problem of water leak may exist.

4. The device of claim 3, wherein each of the water sensor strips further comprises:

a) an exterior covering, said exterior covering having a plurality of holes;

b) first and second conductors disposed within said exterior covering; and c) a plurality of contact sensors formed on the first and second conductors, such that when the contact sensors are exposed to water that enters the exterior covering through said holes, electric current is allowed to flow between the first and second conductors.

5. The device of claim 4, wherein the water-utilizing appliance has water hoses that are connected to a hot-water supply line and a cold-water supply line, wherein the plurality of water sensing strips further comprise a first water sensor strip for wrapping around the water hose connected to the cold-water supply line, a second water sensor strip for wrapping around the water hose connected to the hot-water supply line, and a third water sensor strip for placing on the floor near the water-utilizing appliance.

* * * * *